(12) United States Patent
Lin (10) Patent No.: US 9,047,445 B2
(45) Date of Patent: Jun. 2, 2015

(54) MEMORY DEVICE AND METHOD FOR UPDATING A SECURITY MODULE

(75) Inventor: Jason T. Lin, Santa Clara, CA (US)

(73) Assignee: SanDisk Technologies Inc., Plano, TX (US)

( * ) Notice: Subject to any disclaimer, the term of this patent is extended or adjusted under 35 U.S.C. 154(b) by 672 days.

(21) Appl. No.: 12/495,389

(22) Filed: Jun. 30, 2009

(65) Prior Publication Data

US 2010/0332826 A1    Dec. 30, 2010

(51) Int. Cl.
| | |
|---|---|
| *G06F 9/00* | (2006.01) |
| *G06F 21/10* | (2013.01) |
| *G06F 21/44* | (2013.01) |
| *G06F 21/78* | (2013.01) |
| *H04L 9/32* | (2006.01) |

(52) U.S. Cl.
CPC .............. *G06F 21/10* (2013.01); *G06F 21/445* (2013.01); *G06F 21/78* (2013.01); *G06F 2221/0704* (2013.01); *H04L 9/3268* (2013.01); *H04L 2209/603* (2013.01)

(58) Field of Classification Search
USPC .............. 713/158, 178; 726/20; 455/502, 517
See application file for complete search history.

(56) References Cited

U.S. PATENT DOCUMENTS

| | | |
|---|---|---|
| 7,036,020 B2 | 4/2006 | Thibadeau |
| 7,215,771 B1 | 5/2007 | Hamlin |
| 7,426,747 B2 | 9/2008 | Thibadeau |
| 7,493,656 B2 | 2/2009 | Goodwill et al. |
| 2003/0135465 A1 | 7/2003 | Lee et al. |
| 2003/0195851 A1* | 10/2003 | Ong .................................. 705/50 |
| 2005/0210241 A1* | 9/2005 | Lee et al. ......................... 713/158 |
| 2005/0254386 A1* | 11/2005 | Shavit et al. ................. 369/53.21 |
| 2006/0242068 A1 | 10/2006 | Jogand-Coulomb et al. |
| 2007/0028120 A1* | 2/2007 | Wysocki et al. ............... 713/192 |
| 2007/0275745 A1* | 11/2007 | Owen ............................ 455/502 |
| 2008/0010450 A1 | 1/2008 | Holtzman et al. |
| 2008/0137848 A1 | 6/2008 | Kocher et al. |
| 2008/0215758 A1* | 9/2008 | Gerdes et al. .................. 709/248 |
| 2008/0307495 A1 | 12/2008 | Holtzman et al. |
| 2009/0203355 A1* | 8/2009 | Clark ............................ 455/411 |

(Continued)

FOREIGN PATENT DOCUMENTS

WO    WO 2009/070430 A2    6/2009

OTHER PUBLICATIONS

"Content Protection for Recordable Media Specification," SD Memory Card Book Common Part, Revision 0.961, May 3, 2007, 36 pages.

(Continued)

*Primary Examiner* — Joseph P Hirl
*Assistant Examiner* — Sayed Beheshti Shirazi
(74) *Attorney, Agent, or Firm* — Brinks Gilson & Lione (57) ABSTRACT

A memory device and method for updating a security module are disclosed. In one embodiment, a memory device is provided comprising a memory operative to store content and a controller in communication with the memory. The controller is configured to send an identification of the memory device's security module to a host and receive an identification of the host's security module. If the memory device's security module is out-of-date with respect to the host's security module, the memory device receives a security module update from the host. If the host's security module is out-of-date with respect to the memory device's security module, the memory device sends a security module update to the host.

16 Claims, 8 Drawing Sheets

(56) References Cited

U.S. PATENT DOCUMENTS

2010/0077474 A1* 3/2010 Yacoub et al. .................. 726/20
2010/0118675 A1* 5/2010 Nakano et al. ............. 369/53.21

OTHER PUBLICATIONS

"Content Protection for Games," IBM Systems Journal, vol. 45, No. 1, 2006, pp. 119-143.

"Memory Device and Method for Embedding Host-Identification Information into Content;" inventors: Jason T. Lin, Alexander Kanaris, and Joseph E. Halpern; U.S. Appl. No. 12/492,751, filed Jun. 26, 2009.

"Memory Device and Method for Adaptive Protection of Content;" inventor: Jason T. Lin; U.S. Appl. No. 12/431,353, filed Apr. 28, 2009.

* cited by examiner

MEMORY DEVICE AND METHOD FOR UPDATING A SECURITY MODULE

BACKGROUND

In some content protection systems, if content stored on a media device (e.g., a Blu-ray Disc) is pirated, the pirated copy can be analyzed to determine the identity of the particular host player (e.g., a Blu-ray Disc player) that generated the pirated copy. Once the compromised host player is identified, future media devices can be manufactured with updated authentication credentials that revoke the host player's certificate and key, so that the host player cannot play the content on those future media devices. However, because content protection on a media device such as a Blu-ray Disc is static, a compromised host player may still be able to play content from older media devices, since those older media devices would have out-of-date authentication credentials that do not revoke the host player's certificate and key.

SUMMARY

Embodiments of the present invention are defined by the claims, and nothing in this section should be taken as a limitation on those claims.

By way of example, the embodiments described below generally relate to a memory device and method for updating a security module. In one embodiment, a memory device is provided comprising a memory operative to store content and a controller in communication with the memory. The controller is configured to send an identification of the memory device's security module to a host and receive an identification of the host's security module. If the memory device's security module is out-of-date with respect to the host's security module, the memory device receives a security module update from the host. If the host's security module is out-of-date with respect to the memory device's security module, the memory device sends a security module update to the host.

Other embodiments are provided, and each of the embodiments can be used alone or together in combination. Various embodiments will now be described with reference to the attached drawings.

DETAILED DESCRIPTION OF THE PRESENTLY PREFERRED EMBODIMENTS

Introduction

By way of introduction, the following embodiments generally relate to a memory device and method for updating a security module. These embodiments can be used to address the problems encountered by static content protection systems. Specifically, with static content protection systems, a compromised host player whose certificate and key are revoked can still play content from memory devices that contain an out-of-date security module (e.g., a security module that is using an old certificate revocation list (CRL) that does not identify the host player as being compromised).

With these embodiments, the memory device and host trade identification information of their respective security modules. If the memory device's security module is out-of-date with respect to the host's security module, the memory device receives a security module update from the host. However, if the host's security module is out-of-date with respect to the memory device's security module, the memory device sends a security module update to the host. So, if either the host or the memory device has an out-of-date security module, it will receive an update. This process of checking and updating security modules takes place when the memory device is used with different hosts and when the host is used with different memory devices. In this way, the security module updates can "go viral," perhaps eventually reaching those memory devices that contain out-of-date security modules that would otherwise allow a compromised host to play content stored therein.

Exemplary Security Module Updating Embodiments

Figure 1:
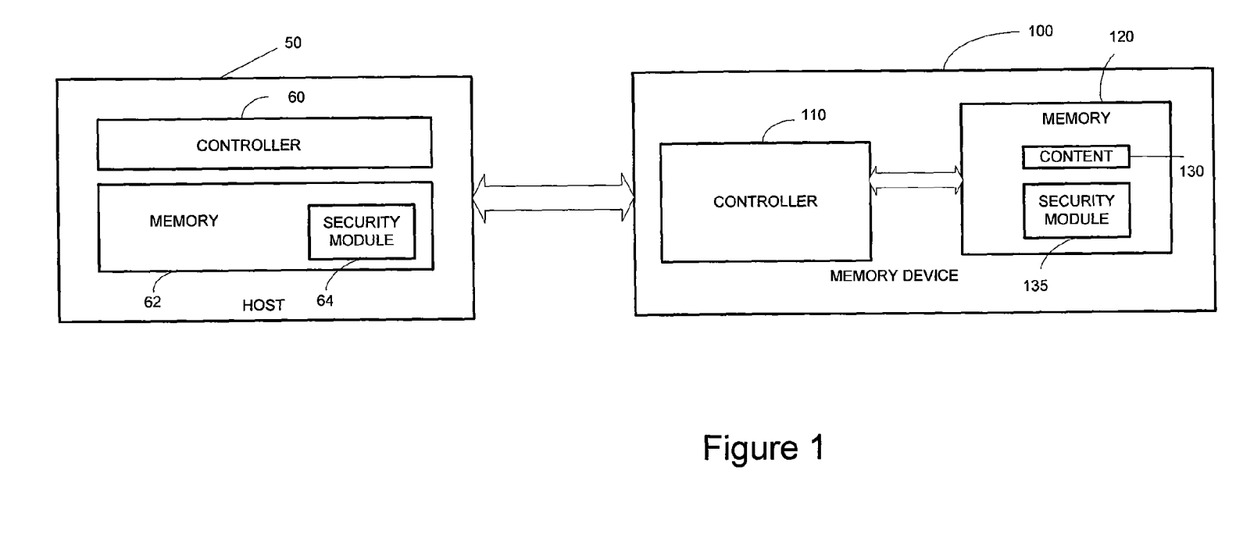
FIG. 1 is a block diagram of a host and a memory device of an embodiment.

Turning now to the drawings, FIG. 1 is a block diagram of a host 50 and a memory device 100 of an embodiment. As shown in FIG. 1, the memory device 100 comprises a controller 110 and a memory 120 operative to store content 130. "Content" can take any suitable form, such as, but not limited to, digital video (with or without accompanying audio) (e.g., a movie, an episode of a TV show, a news program, etc.), audio (e.g., a song, a podcast, one or a series of sounds, an audio book, etc.), still or moving images (e.g., a photograph, a computer-generated display, etc.), text (with or without graphics) (e.g., an article, a text file, etc.), a video game or other software, and a hybrid multi-media presentation of two or more of these forms. The memory 120 is also operative to store a security module 135 that is configured to protect the content 130. Some or all of the security module 135 can be stored in a location outside of the memory 120, such as in the controller 110 or another location in the memory device 100. The security module 135 will be described in more detail below.

The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Examples of controllers include, but are not limited to, the following microcontrollers: ARC 625D, Atmel AT91SAM, Microchip PIC18F26K20, and Silicon Labs C8051F320. Examples of various components that can be used in a controller are described in the embodiments discussed below and are shown in the associated drawings. The controller 110 can also be implemented as part of the memory 120 control logic.

The memory 120 can take any suitable form. In one embodiment, the memory 120 takes the form of a solid-state (e.g., flash) memory and can be one-time programmable, few-time programmable, or many-time programmable. However, other forms of memory, such as optical memory and magnetic memory, can be used. Although shown as single components in FIG. 1, the controller 110 and/or memory 120 can be implemented with several components. Further, the memory device 100 can contain other components, which are not shown in FIG. 1 to simplify the drawings. In one embodiment, the memory device 100 takes the form of a handheld, removable memory card (e.g., a flash storage card); however, the memory device 100 can take other forms, such as, but not limited to, a solid-state drive and a universal serial bus (USB) device.

As shown in FIG. 1, the memory device 100 is in communication with the host device 50. As used herein, the phrase "in communication with" means directly in communication with or indirectly in communication with through one or more components, which may or may not be shown or described herein. The host 50 can take any suitable form, such as, but not limited to, a dedicated content player, a mobile phone, a personal computer (PC), a game device, a personal digital assistant (PDA), a kiosk, and a TV system. Preferably, the memory device 100 is removably connected to the host 50, so a user can use the memory device 100 with a variety of hosts. Like the memory device 100, the host 50 comprises a controller 60 and a memory 62 that is operative to store a security module 64. Some or all of the security module 64 can be stored in a location outside of the memory 62, such as in the controller 60 or another location in the host 50. Also, as will be described in more detail below, the security module 64 can be provided to the host 50 from a variety of sources.

Figure 2:
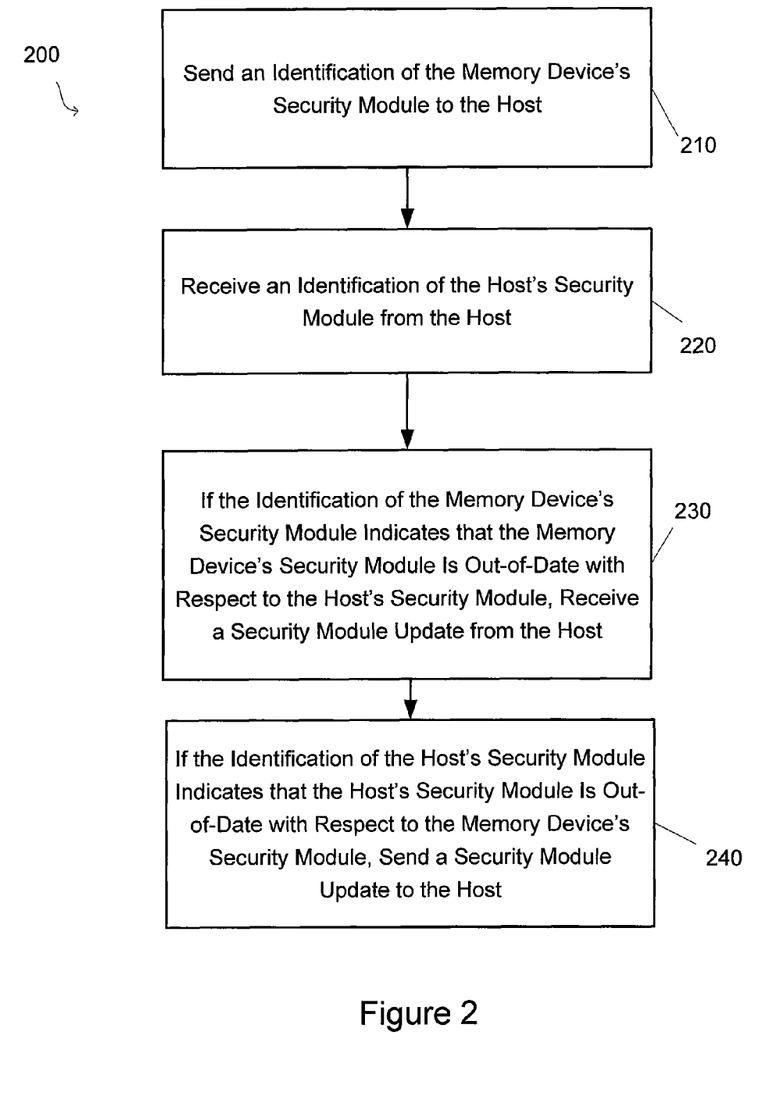
FIG. 2 is a flow chart of a method of an embodiment for updating a security module.

FIG. 2 is a flow chart 200 of a method of an embodiment for updating a security module. In one embodiment, these acts are performed after the controller 110 in the memory device 100 receives a credential from the host 50 and authenticates the host 50 using the credential. (Preferably, mutual authentication and key exchange are performed, in which case the memory device 100 would provide its own credential to the host 50 for authentication.) The credential can be part of a public key infrastructure ("PKI") certificate that binds a public key with the host-identification information and is used during the authentication process to verify that the public key belongs to the host 50. As shown in FIG. 2, the memory device 100 sends an identification of the memory device's security module 135 to the host 50 (act 210) and receives an identification of the host's security module 64 (act 220). (It should be noted that these and other acts discussed herein can be performed in any suitable order.) A security module's identification can take any suitable form, such as, but not limited to, a revision number or a time stamp. If the identification of the memory device's security module 135 indicates that the memory device's security module 135 is out-of-date with respect to the host's security module 64, the memory device 100 receives a security module update from the host 50 (act 230). However, if the identification of the host's security module 64 indicates that the host's security module 64 is out-of-date with respect to the memory device's security module 135, the memory device 100 sends a security module update to the host 50 (act 240). (Examples of various security modules and their updates are described in the next section.)

One of the advantages of these embodiments is that if either the host 50 or the memory device 100 has an out-of-date security module, it will receive an update. This process of checking and updating security modules takes place when the memory device 100 is used with different hosts and when the host 50 is used with different memory devices. In this way, the security module updates can "go viral," ensuring that every memory device and host that the updated host 50 and memory device 100 come in contact with will receive the most up-to-date security module updates. Eventually, the security module updates may spread to those memory devices that contain out-of-date security modules that would otherwise allow a compromised host to play content stored therein.

Figure 3A:
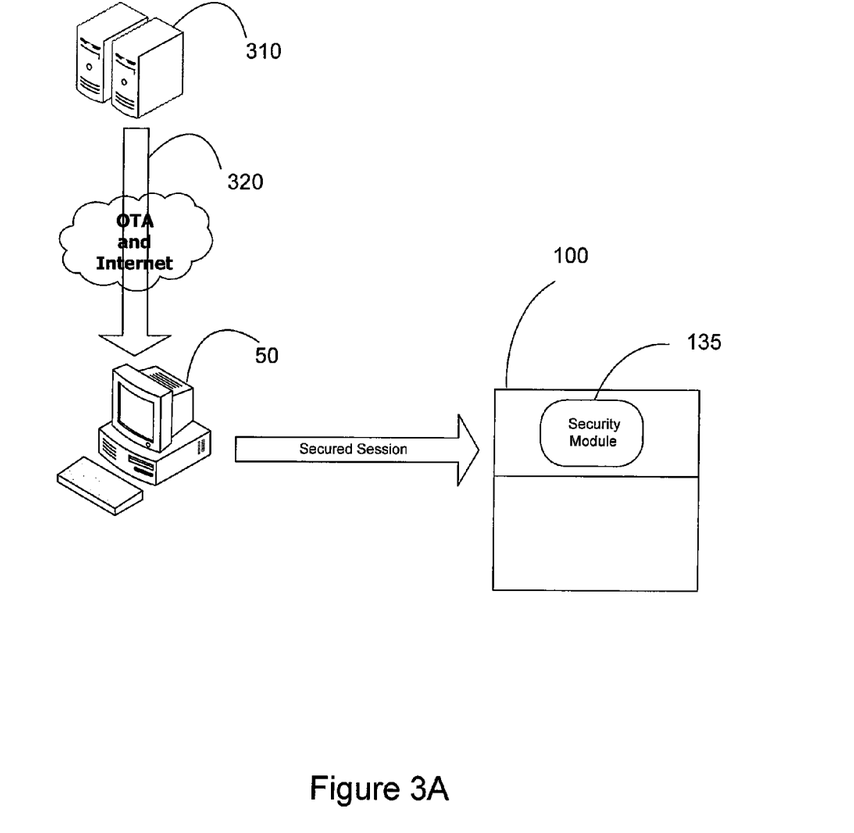
FIGS. 3A-3C are diagrams that illustrate various ways of updating a security module of an embodiment.
Figure 3B:
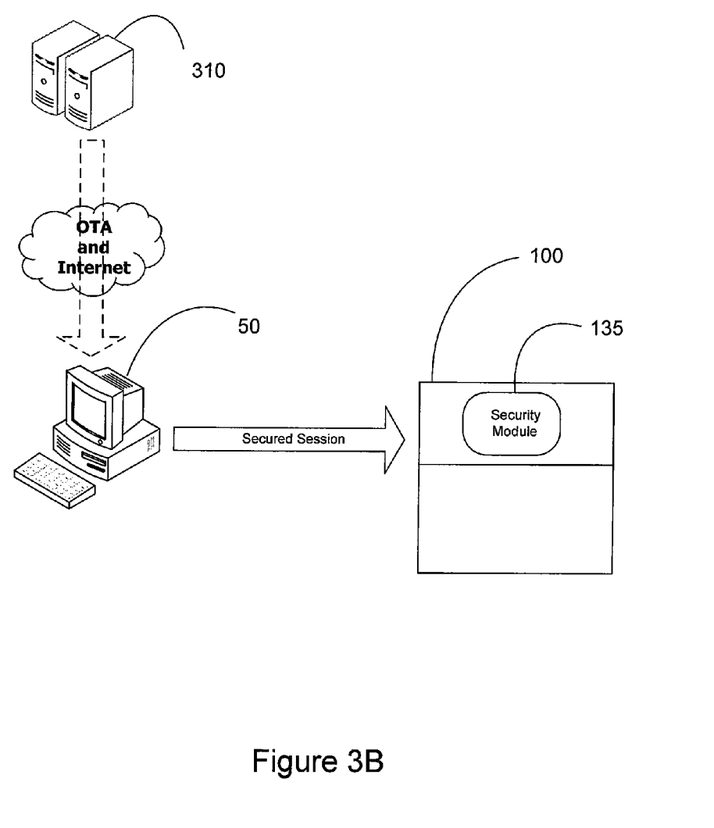
Figure 3C:
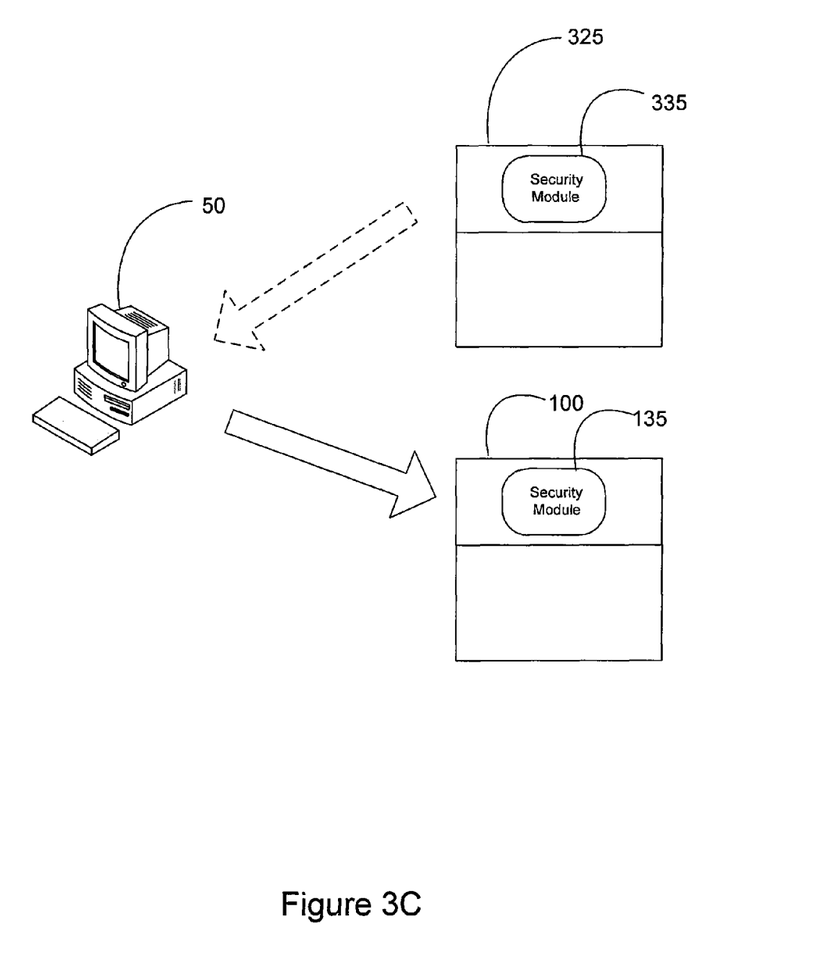

The host's security module 64 and its updates can be provided to the host 50 (and, from there, to the memory device 100) from a variety of sources. For example, as shown in FIG. 3A, the security module update can be provided to the host 50 (here, a PC) from a server 310 that it is presently online and securely connected with (e.g., via an over-the-air (OTA) or Internet connection 320). Alternatively, as shown in FIG. 3B, the security module update can be provided to the memory device 100 from a host 50 that had previously connected to the server 310. In this alternative, it is preferred that the host 50 be able to obfuscate and protect the security module update targeted for the memory device 100. In this way, even if the host 50 were to eventually yield to a hacker, the obfuscated security module update would provide additional protection and a barrier for the hacker to defeat the content protection system. As another alternative, shown in FIG. 3C, the security module 335 can be available to the host 50 from another memory device 325. In this alternative, the security module 335 is preloaded into another memory device 325 and later gets securely loaded into the host 50. As with the above-described alternative, it is preferred that the host 50 be able to obfuscate and protect the security module update from the other memory device 325 as an additional protection mechanism. It should be noted that other alternatives are possible. For example, the security module update can be supplied to the host 50 from another host.

Exemplary Security Modules

As noted above, the security module 135 in the memory 100 is configured to protect content 130 stored in the memory 120. The security module 135 can take any suitable form (e.g., software/firmware/hardware) and can protect the content 130 in any suitable manner. The following paragraphs describe some exemplary security modules. It should be noted that other security modules can be used, and these and other security modules can be used alone or together in combination.

In one embodiment, the security module 135 protects the content 130 by allowing only authenticated and authorized hosts to plays the content 130. For example, the memory device 100 can store a list of authentication credentials of those hosts that are allowed (or not allowed) to play the content 130. For example, the memory device 100 can store a certificate revocation list (CRL), and, when a host authenticates to the memory device 100, the memory device 100 would check the host's authentication credentials against the CRL. If the host authentication credentials are listed in the CRL, the memory device 100 would not allow the host to play the content. As mentioned above, one problem with this content protection system is that if the CRL were static, a host whose credentials were revoked in new-issued CRLs would still be able to play content from memory devices storing the old CRL. Accordingly, the security module update can take the form of updated authentication credentials (e.g., an updated CRL). This update solves the problem discussed above of a compromised host still being able to play content from older memory devices that have out-of-date authentication credentials.

As another example, the security module 135 can contain a content protection algorithm that the memory device 100 executes to protect the content 130 before it sends the content 130 to the host 50 (the memory device 100 can also send virtual machine code to the host 50 to instruct it how to "undo" the protection), and the security module update can take the form of a new or different content protection algorithm. Examples of content protection algorithms include, but are not limited to, those that perform one or more of the following operations: (1) AES encrypt data in segments with different predetermined keys, (2) SHA-1 encryption with the key obfuscated in the host virtual machine code, (3) XOR data bits with a fix value obfuscated in the host virtual machine code, (4) XOR every other byte in chunks with different values, (5) XOR data bits and then 3DES encrypt with a random key, (6) AES encrypt with a host unique certification ID, (7) AES encrypt with a memory device unique certification ID, and (8) AES encrypt with NXOR of host and memory device certificate ID. While the memory device 100 can store and use a single content protection algorithm and the security module update can be a replacement for this single algorithm, it is preferred that the memory device 100 store a plurality of content protection algorithms and be able to adaptively apply these algorithms. This provide dynamic protection of the content because even if a hacker hacks the content protection algorithm used in one instance of playback of the content, the content will still be protected because the memory device 100 will protect the content with a different content protection algorithm at the another instance of playback of the content. Criteria for the selection of a content protection algorithm can include, but is not limited to, host credentials, memory device credentials, host environment, memory device environment, type of content, and information about a virtual machine code previously-generated by the controller 110, as well as instructions on whether the selection of the algorithm is predetermined, pseudo-random, or random.

As yet another example, the security module 135 can contain an algorithm configured to embed host-identification information into the content 130, and the security module update can comprise an updated embedding algorithm. In order to identify a host that is used to pirate content, the security module 135 in the memory device 100 can obtain identification information of the host 50 (e.g., from the credential used to authenticate the host 50 to the memory device 100) and embed that host-identification information into the content 130. In this way, if the content 130 were to be pirated, the content 130 can be analyzed to obtain the embedded host-identification information and, therefore, identify the host 50. The host-identification information embedding algorithm present in the security module 135 or sent as an update can take any suitable form, such as, but not limited to, one or more of the following: (a) embedding host-identification information in a last frame of a group of pictures ("GOP") in a series of GOPs, (2) embedding host-identification information in unreferenced frames, (3) embedding host-identification information in unreachable GOPs, (4) embedding host-identification information in "user data" packets, and (5) embedding host-identification information in unreferenced streams in a system layer. It should be noted that the security module 135 can be used to perform other types of "watermarking." For example, the watermarking technique of the security module 135 can rely on choosing specific ones of redundant frames in order to watermark the content 130.

Another example of a security module 135 is one that provides digital rights management (DRM) functionality. DRM can be used to limit how and when the content 130 can be played or copied. For example, DRM can specify that the content 130 can only be played on certain types of hosts or by certain specific users, the number of times the content 130 can be played, a time when the content 130 can be played, and an expiration date specifying when the content 130 can no longer be played. In this example, the security module update can be a new or different restriction (or a removal of a restriction) on the playback of the content 130. Some other examples of security module updates include, but are not limited to, different encryption methods (e.g., to re-encrypt part or all of the content 130 with another key), updating management of content encryption keys stored in the memory device 100, and updating virtual machine code to alter host-memory device security protocols.

Exemplary Memory Device

As noted above, the memory device of these embodiments can be implemented in any suitable manner. The following paragraphs and referenced drawings describe one exemplary implementation. It should be understood that this implementation is merely an example and that details shown and described herein should not be read into the claims unless explicitly recited therein.

Figure 4:
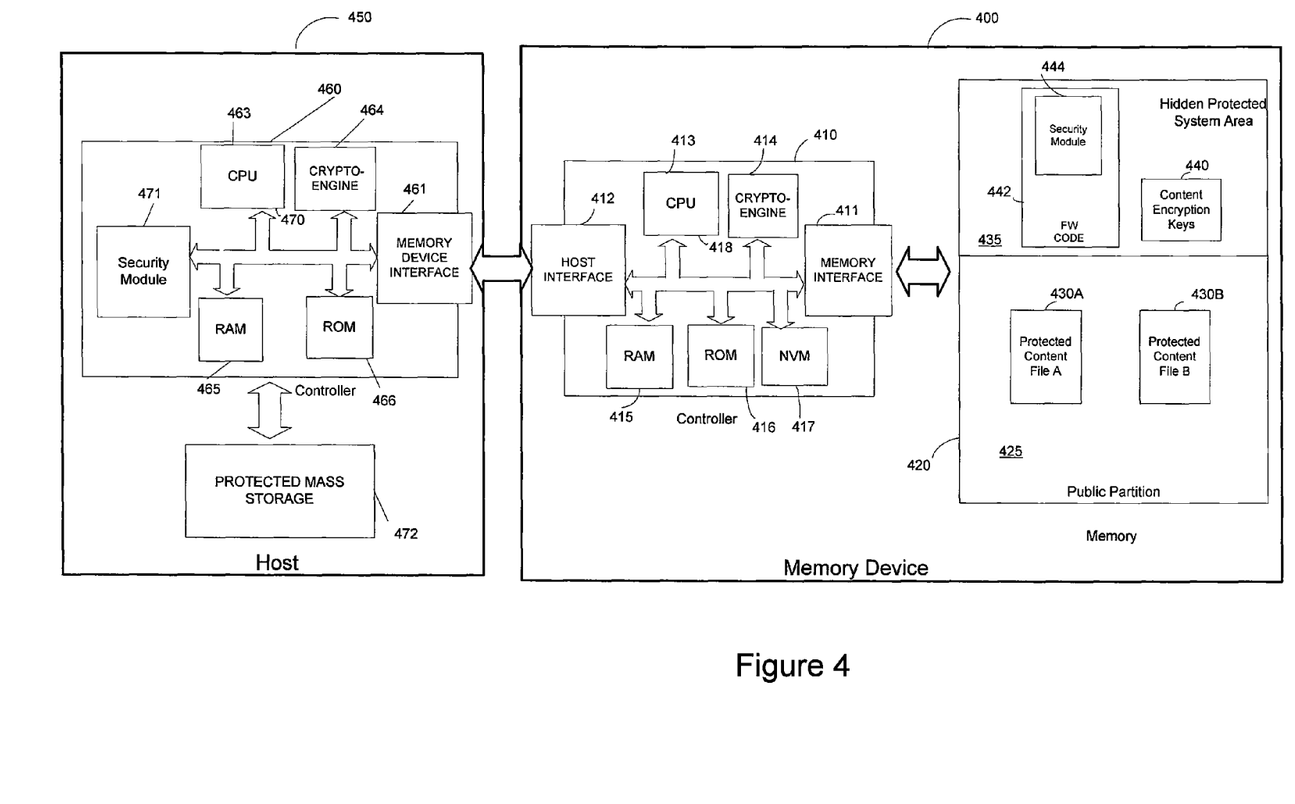
FIG. 4 is a block diagram of a host and a memory device of an embodiment.

Returning to the drawings, FIG. 4 is a block diagram of a memory device 400 and host 450 of an embodiment. As shown in FIG. 4, the memory device 400 comprises a controller 410 and a memory 420. The controller 410 comprises a memory interface 411 for interfacing with the memory 420 and a host interface 412 for interfacing with the host 450. The controller 410 also comprises a central processing unit (CPU) 413, a crypto-engine 414 operative to provide encryption and/or decryption operations, read access memory (RAM) 415, read only memory (ROM) 416 which stores firmware (logic) for the basic operations of the memory device 400, and a non-volatile memory (NVM) 417 which stores a device-specific key used for encryption/decryption operations. It should be noted that the memory device-specific key can be stored in other memory areas within the memory device. The components shown in FIG. 4 can be implemented in any suitable manner.

In this embodiment, the memory 420 comprises a public partition 425 that is managed by a file system on the host 450 and a hidden protected system area 435 that is internally managed by the controller 410. The hidden protected system area 435 stores content encryption keys (CEKs) 440 and firmware (FW) code 442 (e.g., a security module 444 containing, for example, authentication credentials and a CRL). The public partition 425 and the hidden protected system area 435 can be part of the same memory unit or can be different memory units. The hidden protected system area 435 is "hidden" because it is internally managed by the controller 410 (and not by the host controller 460) and is "protected" because objects stored in that area 435 are encrypted with the unique key stored in the non-volatile memory 417 of the controller 410. (The memory device hardware unique key can be stored in the non-volatile memory 417 of the controller 410 or other areas within the memory device 400.) Accordingly, to access objects stored in that area 435, the controller 410 would use the crypto-engine 414 and the key stored in the non-volatile memory 417 to decrypt the encrypted objects. Preferably, the memory device 400 takes the form of a secure product from the family of products built on the Trusted-Flash™ platform by SanDisk Corporation.

The public partition 425 of the memory stores protected content files 430A, 430B. In this embodiment, the content files 430A, 430B, which can be different versions (e.g., resolution) of the same content title, are provided by a content provider and are released to a content replication and ingestion facility, which loads the content files 430A, 430B in the public partition 425. (Instead of the content 430A, 430B being preloaded in the memory device 420, the content files 430A, 430B can be side-loaded or downloaded into the memory device 420 using a content loading system, such as a kiosk or a PC connected to the Internet.) While the public partition 425 of the memory 420 is managed by a file system on the host 450, objects stored in the public partition 425 (such as the content files 430A, 430B) may also be protected by the memory device 400. In this embodiment, both stored content files 430A, 430B are protected by respective content encryption keys 440 stored in the hidden protected system area 435, and those keys 440 are themselves protected by the memory-device unique key stored in the non-volatile memory 417 of the controller 410. Accordingly, to unprotect one of the protected content files (say, content file 430A), the crypto-engine 414 would use the memory-device unique key stored in the non-volatile memory 417 of the controller 410 to decrypt the appropriate content encryption key 440 and then use the decrypted content encryption key 440 to decrypt the protected content 430A.

Turning now to the host 450, the host 450 comprises a controller 460 that has a memory device interface 461 for interfacing with the memory device 400. The controller 460 also comprises a central processing unit (CPU) 463, a crypto-engine 464 operative to provide encryption and/or decryption operations, read access memory (RAM) 465, read only memory (ROM) 466, and a security module 471. It should be noted that each component in box 460 can be implemented as separate chips in the overall host system. The host 450 also comprises protected mass storage 472.

The memory device 400 and the host 450 communicate with each other via a memory device interface 461 and a host interface 412. For operations that involve the secure transfer of data, it is preferred that the crypto-engines 414, 464 in the memory device 400 and host 450 be used to mutually authenticate each other and provide a key exchange. The mutual authentication process calls for the host 450 and memory device 400 to exchange unique certification IDs. After mutual authentication is complete, it is preferred that a session key be used to establish a secure channel for communication between the memory device 450 and host 400.

Figure 5:
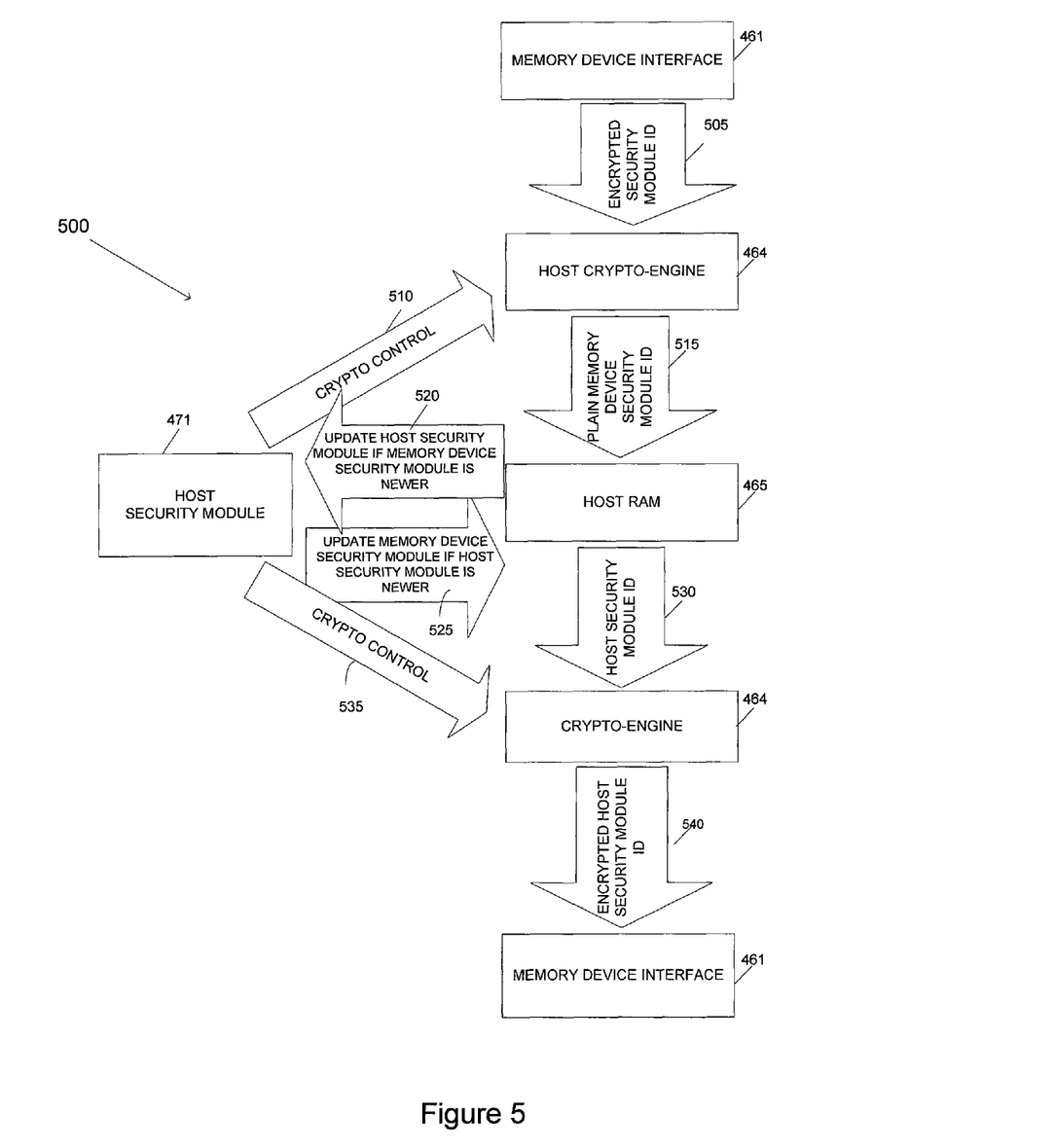
FIG. 5 is a flow chart of a method of an embodiment for updating a security module.

As mentioned above, the memory device 400 in this embodiment can be used to update a security module. FIG. 5 contains a flow chart 500 that illustrates the acts of a method for updating a security module. As shown in FIG. 5, the memory device 400 provides identification of its security module 444 to the host 450 via the memory device interface 461 (act 505). Preferably, this identification information is encrypted, and the host's crypto-engine 464 decrypts this identification information in response to a crypto control command from the host's security module 471 (act 510). The plain (i.e., unencrypted) memory device security module ID is then sent to the host's RAM 465 (act 515). Based on a comparison of the identification information of the memory device's and host's security modules, the memory device 400 updates the host's security module 471 if the memory device's security module 444 is newer (act 520). Likewise, the host 450 updates the memory device's security module 444 if the host's security module 471 is newer (act 525). If the host 450 updates the memory device's security module 444, the host 450 will provide the memory device 400 with an updated security module ID, so that, in the future when the above process is performed, it will be performed with the updated security module ID instead of with the old security module ID. Accordingly, as shown in FIG. 5, the host's RAM 465 provides the host's security module ID to the host's crypto-engine 464 (act 530), which, under the crypto control of the host's security module 571 (act 535) encrypts the ID and sends it to the memory device 400 via the memory device interface 461 (act 540).

Figure 6:
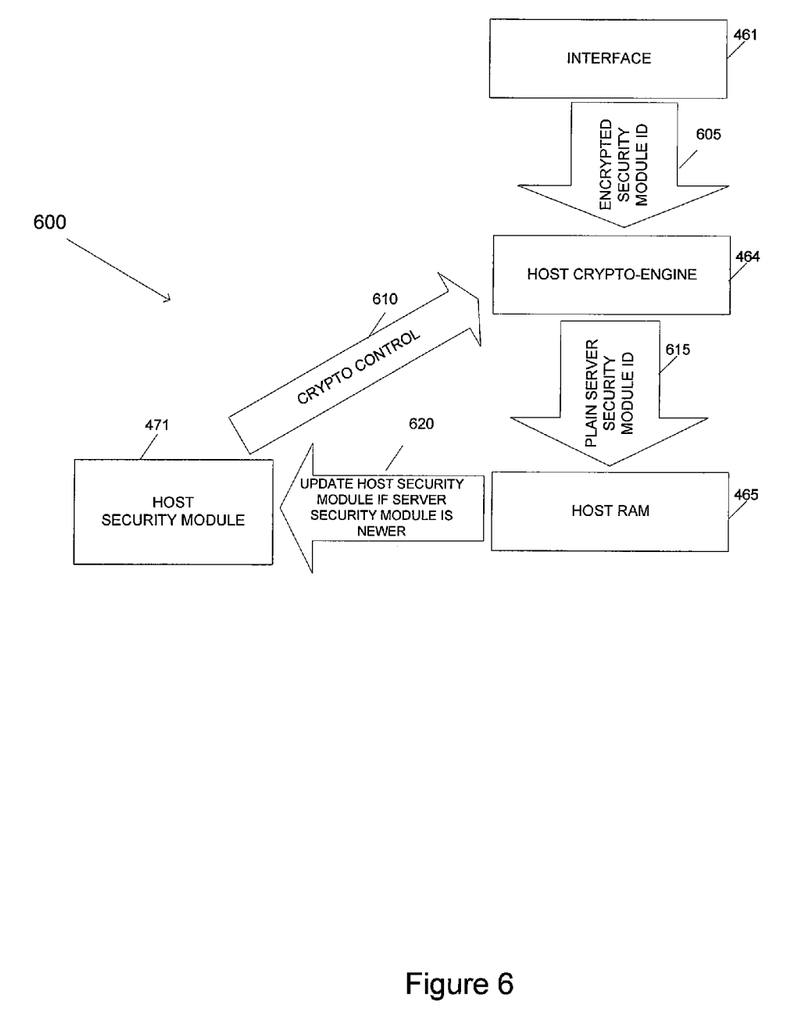
FIG. 6 is a flow chart of a method of an embodiment for updating a security module from a server.

As mentioned above, the host 450 can received its security module 471 from a source other than the memory device 400 (e.g., from another memory device, from another host, or from a server). FIG. 6 is a flow chart 600 of a method for receiving a security module from a server. As shown in FIG. 6, the server provides identification of its security module to the host 450 (act 605). Preferably, this identification information is encrypted, and the host's crypto-engine 464 decrypts this identification information in response to a crypto control command from the host's security module 471 (act 610). The plain (i.e., unencrypted) server security module ID is then sent to the host's RAM 465 (act 615). Based on a comparison of the identification information of the server's and host's security modules, the host 450 updates its security module 471 if the server's security module is newer (act 620).

CONCLUSION

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A memory device for use with a plurality of hosts, the memory device comprising:
 a memory operative to store content; and
 a controller in communication with the memory, wherein the controller is configured to:
  perform the following when the memory device is in communication with a first host:
   send an identification of the memory device's security module to the first host, wherein the memory device's security module comprises an algorithm that, when executed by the memory device, performs an operation on the content to protect the content, wherein the identification of the memory device's security module indicates that the memory device's security module is out-of-date with respect to the first host's security module; and
   receive a security module update from the first host to bring the memory device's security module up-to-date with respect to the first host's security module; and
  perform the following when the memory device is in communication with each of a plurality of other hosts:
   receive an identification of the host's security module, wherein the host's security module is a counterpart to the memory device's security module and comprises an algorithm that, when executed by the host, allows the host to read content protected by the memory device's security module, wherein the identification of the host's security module indicates that the host's security module is out-of-date with respect to the memory device's security module; and
   send a security module update to the host, wherein the security module update comprises updated virtual machine code configured to adaptively generate a content protection algorithm;
  wherein the security module of each of the plurality of other hosts is brought up-to-date with respect to the first host's security module via the memory device by virtue of the memory device being placed in communication with each of the plurality of other hosts.

2. The memory device of claim 1, wherein the security module update comprises an updated content protection algorithm.

3. The memory device of claim 1, wherein the security module update comprises an updated algorithm configured to embed host-identification information into the content.

4. The memory device of claim 1, wherein the security module update comprises an updated digital rights management (DRM) module.

5. The memory device of claim 1, wherein the security module update updates management of content encryption keys stored in the memory device.

6. The memory device of claim 1, wherein the security module update received from the first host is supplied to the first host from a server.

7. The memory device of claim 1, wherein the security module update received from the first host is supplied to the first host from another memory device.

8. The memory device of claim 1, wherein the security module update received from the first host is supplied to the first host from another host.

9. A method for updating a security module, the method comprising:

performing the following in a controller of a memory device when the memory device is in communication with a first host, the memory device including a memory operative to store content:

sending an identification of the memory device's security module to the first host, wherein the memory device's security module comprises an algorithm that, when executed by the memory device, performs an operation on the content to protect the content, wherein the identification of the memory device's security module indicates that the memory device's security module is out-of-date with respect to the first host's security module; and receiving a security module update from the first host to bring the memory device's security module up-to-date with respect to the first host's security module; and performing the following in the controller of the memory device when the memory device is in communication with each of a plurality of other hosts:

receiving an identification of the host's security module, wherein the host's security module is a counterpart to the memory device's security module and comprises an algorithm that, when executed by the host, allows the host to read content protected by the memory device's security module, wherein the identification of the host's security module indicates that the host's security module is out-of-date with respect to the memory device's security module; and sending a security module update to the host, wherein the security module update comprises updated virtual machine code configured to adaptively generate a content protection algorithm;

wherein the security module of each of the plurality of other hosts is brought up-to-date with respect to the first host's security module via the memory device by virtue of the memory device being placed in communication with each of the plurality of other hosts.

10. The method of claim 9, wherein the security module update comprises an updated content protection algorithm.

11. The method of claim 9, wherein the security module update comprises an updated algorithm configured to embed host-identification information into the content.

12. The method of claim 9, wherein the security module update comprises an updated digital rights management (DRM) module.

13. The method of claim 9, wherein the security module update updates management of content encryption keys stored in the memory device.

14. The method of claim 9, wherein the security module update received from the first host is supplied to the first host from a server.

15. The method of claim 9, wherein the security module update received from the first host is supplied to the first host from another memory device.

16. The method of claim 9, wherein the security module update received from the first host is supplied to the first host from another host.

* * * * *